US006487529B1

(12) United States Patent
Miet

(10) Patent No.: US 6,487,529 B1
(45) Date of Patent: Nov. 26, 2002

(54) AUDIO PROCESSING DEVICE, RECEIVER AND FILTERING METHOD FOR FILTERING A USEFUL SIGNAL AND RESTORING IT IN THE PRESENCE OF AMBIENT NOISE

(75) Inventor: Gilles Miet, Le Mans (FR)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/426,496

(22) Filed: Oct. 26, 1999

(30) Foreign Application Priority Data

Oct. 30, 1998 (FR) .......................................... 98 13700

(51) Int. Cl.$^7$ ................................................ G10L 15/20

(52) U.S. Cl. ........................ 704/233; 704/217; 704/205; 704/500

(58) Field of Search ................................. 704/233, 200, 704/201, 219, 205, 207, 208, 264, 268, 500, 226, 227, 228

(56) References Cited

U.S. PATENT DOCUMENTS

| | | | | | |
|---|---|---|---|---|---|
| 4,052,720 | A | | 10/1977 | McGregor et al. | 340/420 |
| 4,720,802 | A | * | 1/1988 | Damoulakis et al. | 364/513.5 |
| 5,027,410 | A | * | 6/1991 | Williamson et al. | 381/68.4 |
| 5,251,263 | A | * | 10/1993 | Andrea et al. | 381/71 |
| 5,717,823 | A | * | 2/1998 | Kleijn | 704/220 |
| 5,943,645 | A | * | 8/1999 | Ho et al. | 704/226 |
| 5,966,689 | A | * | 10/1999 | McCree | 704/226 |

* cited by examiner

*Primary Examiner*—Richemond Dorvil
(74) *Attorney, Agent, or Firm*—Dicran Halajain

(57) ABSTRACT

An audio processing device includes an analyzer and a filter. The analyzer extracts an envelope of a noise signal and derives therefrom noise envelope parameters. The filter has coefficients which vary in response to noise envelope parameters and filters a useful signal to form a filtered signal. The coefficients are varied so that the filter enhances frequency bands of the useful signal that correspond to frequency bands of the noise signal having a higher energy than a predetermined value.

21 Claims, 3 Drawing Sheets

AUDIO PROCESSING DEVICE, RECEIVER AND FILTERING METHOD FOR FILTERING A USEFUL SIGNAL AND RESTORING IT IN THE PRESENCE OF AMBIENT NOISE

FIELD OF THE INVENTION

The invention relates to an audio processing device and a receiver for receiving and filtering a useful signal that has a spectral envelope situated in the voice band, and for restoring the useful signal in the presence of ambient noise.

The invention also relates to a telephone equipment comprising such a receiver.

The invention finally relates to a filtering method and a method of receiving a useful signal that has a spectral envelope situated in the voice band, for modifying the spectral envelope of the useful signal before restoring the useful signal in the presence of ambient noise.

The invention has many applications in electronic audio devices that may be used in a noisy environment. The invention is notably applied to mobile radiotelephony equipment that may be used inside a car and enables to reduce the acoustic annoyance linked with the noise of the engine and/or of the car radio.

BACKGROUND OF THE INVENTION

United States patent published under U.S. Pat. No. 4,052,720 describes a dynamic ambient noise control system for distributing a random ambient noise at a workplace having surround sensors and for adjusting the spectrum and the amplitude of the distributed ambient noise as a function of the value of certain surround parameters measured at predetermined time intervals by the various sensors.

This system is intended to have a positive effect on users at their workplace, notably for enhancing their productivity or reducing the effect of interference between the various conversations. It shows the main drawback of increasing the sound level of the overall ambient noise, which, over a long period, may generate a specific tight feeling with the users.

SUMMARY OF THE INVENTION

It is an object of the invention to provide an audio processing device, a radio receiver and a filtering method and a receiving method for improving the acoustic comfort of the user in a noisy environment, even in the case of intensive and/or prolonged use.

For this purpose, the invention provides an audio processing device of the type defined in the opening paragraph, characterized in that it comprises means for tapping ambient noise, spectral envelope extraction means for extracting parameters of the tapped ambient noise envelope and digital filter means controlled by said envelope parameters for modifying the spectral envelope of the useful signal to be restored, said filter means comprising a digital filter having coefficients that can be parameterized, and co-operate with said envelope extraction means for parameterizing the filter with the aid of the envelope parameters.

According to a characteristic feature of the invention, a device as already mentioned is provided, characterized in that it comprises an echo canceling loop controlled by the output signal of the digital filter for suppressing the acoustic echo that exists in the sampled ambient noise and for supplying an estimate of the ambient noise to said extraction means. Similarly, the invention provides a filtering method as mentioned in the opening paragraph, characterized in that it comprises the following steps:

an acquisition and spectral analysis step of tapping the ambient noise, extracting an estimate of a spectral envelope therefrom and of deriving envelope parameters therefrom, a step of calculating a time average between the envelope parameters to obtain average parameters called control parameters, a parameterizing step of parameterizing a digital filter with the aid of said calculated control parameters, and a filtering step of filtering the useful signal with the aid of said digital filter.

BRIEF DESCRIPTION OF THE DRAWINGS

These and other aspects of the invention are apparent from and will be elucidated, by way of non-limiting example, with reference to the embodiment(s) described hereinafter.

In the drawings.

DESCRIPTION OF THE EMBODIMENTS

Figure 1:
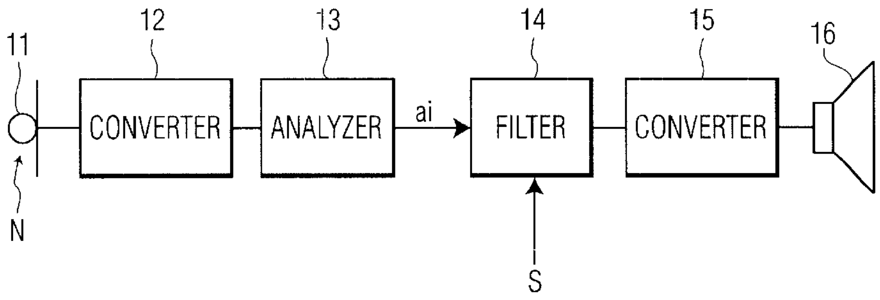
FIG. 1 is a diagram showing an operative example of an audio processing device according to the invention.

The example of the device shown in FIG. 1 may be integrated with any electronic audio device that may be used in a noisy environment and notably in mobile radio telephony equipment of the "hands-free" type that may be used in a motorcar. It enables to reduce the acoustic annoyance linked with the noise of the engine and possibly of the car radio if the car radio is on during a telephone conversation.

In an operative example of the invention, the useful signal is a digital telephone signal obtained on the output of a coder/speech decoder of a conventional digital receiving circuit. According to another operative example, the useful signal may be tapped directly from the output of radio equipment, for example, a car radio. The first example corresponds to a current situation where a radio telephone communication is received in a noisy environment, notably at a public place or in a private car. In this case this is about reducing the acoustic unpleasantness due to the noise of the engine and of the car-radio. A second example is applied to a user, notably a motorist, simply listening to the radio or to the recorded music broadcast by radio equipment (laser disc, cassette, car radio etc.) in his automobile. It is indeed about reducing the selective spectral masking effect caused by the influence of the engine noise mainly on the audio signal emitted by the audio device.

Ambient noise having a certain frequency spectrum and a certain amplitude produces a double masking effect on an audio frequency signal. The first effect, called global masking, due to a too low amplitude ratio between the useful signal and the noise signal, may be compensated, for example, by increasing the sound volume of the useful signal. This is nevertheless fatiguing when used for a longer period of time. The second effect, called selective spectral masking, due to the spectral composition of the ambient noise, provokes a selective alteration of the spectrum of the useful signal. This effect is very harmful, because it modifies the acoustic perception of the useful signal by changing the nature of the useful signal.

The device of FIG. 1 enables to remedy these two masking effects by selectively modifying the spectral envelope of the useful signal as a function of that of the noise signal. It comprises a microphone 11 for capturing the ambient noise denoted N, an acquisition and conversion block 12 for transforming the analog noise signal received by the microphone 11 into a digital noise signal corresponding to the ambient noise. This digital noise signal is processed by a spectral analysis block 13 for extracting the spectral envelope of the signal and deriving its envelope parameters denoted $a_i$ therefrom. A filter block 14 controlled by the spectral analysis block 13 receives on the input an audio signal denoted S (the useful signal) to apply to the signal S a digital filter whose coefficients vary as a function of the values of the envelope parameters ai produced by the spectral analysis block. The output signal of the filter is then converted into an analog signal and amplified by an amplification and conversion block 15 before being sent to the output to a loudspeaker 16.

In the first operative example, the ambient noise N captured by the microphone 11 is formed by the noise from the engine added to the noise of the car radio (or the audio equipment) as the case may be. The position of the microphone 11 relative to the ambient noise source is important for optimizing the effectiveness of the device. Indeed, the microphone is to be placed so as to capture the useful signal that has only low amplitude relative to the noise. In an automobile, for example, it is to be preferred to place the microphone near to the engine and remote from the useful signal source (user or audio equipment) so that the useful signal is not processed as ambient noise. In the second operative example, the ambient noise comprises only noise from the engine.

Figure 2:
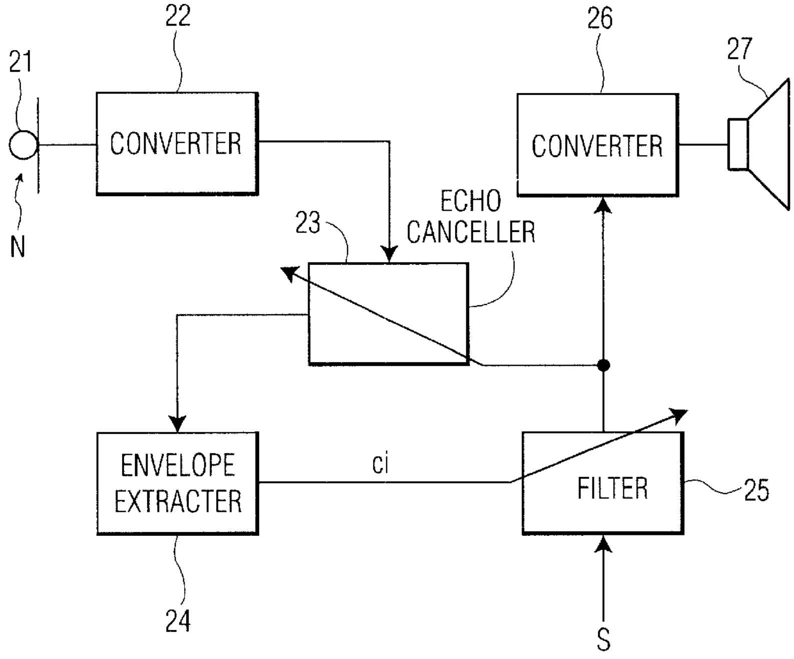
FIG. 2 illustrates a preferred embodiment of a device according to the invention.

FIG. 2 shows a preferred embodiment of the invention particularly advantageous for a digital radio telephony application of the "hands-free" type where the useful signal is formed by the digital telephone signal taken from the output of the telephone before of the signal is amplified to a loudspeaker output. The assembly of the device may be integrated, for example, with a car telephone kit that has the "hands-free" function. For an analog useful signal S it is necessary to provide digitizing means in the filter block referenced 14 in the FIG. 1, or 25 in FIG. 2, for digitizing the useful signal before applying the signal to the digital filter.

According to the preferred embodiment an echo-canceling loop is provided for minimizing the influence of the useful signal on an estimate of the ambient noise. Indeed, the "hands-free" system amplifies the received speech signal, so that the latter is captured by the microphone at the same time as the local user's speech signal. As the phenomenon is furthermore amplified in a confined space such as a driver's compartment, the remote speaker is likely to hear an echo of his own voice. According to a preferred embodiment of the invention, an echo canceling loop is used for suppressing the contribution of the amplified speech signal of the remote speaker to the ambient noise mainly generated by the engine and possibly by audio equipment of the car radio type. The echo canceling loop, integrated in most "hands-free" car equipment is thus advantageously re-used.

The ambient noise mixed with the amplified speech signal of the speaker is captured by the microphone 21 and is digitized by the acquisition and conversion block 22. The digital signal resulting from this conversion is supplied to the input of an echo canceling block 23 of a conventional type to restore a digital noise estimate that corresponds to the ambient noise cleared of echo phenomena coming from, inter alia, the useful signal. Noise suppression techniques are described in the journal IEEE Signal Processing vol. 8, no. 4, pp. 387 to 400 of July 1985 in the article by Peter Vary "Noise suppression by spectral magnitude estimation - mechanism and theoretical limit". The digitized noise estimate is then supplied to the input of an envelope extraction device 24 that includes, for example, a predictive analyzer of the LPC type (Linear Predictive Coding) for determining the spectral envelope of the noise signal (or its estimate) and extracting therefrom LPC envelope parameters characteristic of the spectral envelope of the signal of the parameters denoted ai. The parameters ai are then smoothed with time, for example, every 10 data frames or also every 200 ms roughly, by an appropriate calculation element so as to compensate any sudden variations in the supplied values ai. The calculation element obtains average parameters or control parameters ci injected into a digital filter block 25 for parameterizing a digital filter having length m intended to filter the useful signal S.

For example, the equation of the filter may be written as:

$$\alpha + (1-\alpha) * \frac{\sum_{i=0}^{m} c_i (z/\gamma_1)^{-i}}{\sum_{i=0}^{m} c_i (z/\gamma_2)^{-i}}$$

where:

α is a real coefficient lying between 0 and 1 that enables to control the weight of the filter, the symbol * indicates a multiplication, γ1 and γ2 are weight factors indicating respectively the distance from the root of the $$\sum_{i=0}^{m} c_i (z/\gamma_1)^{-i} \quad \text{and} \quad \sum_{i=o}^{m} c_i (z/\gamma_2)^{-i}$$

to the unity circle, with 0<γ1<γ2<1.

The filtered signal is then amplified and converted into an analog signal by an amplification and conversion block 26 to be sent to the output via a loudspeaker 27.

According to a variant of embodiment of the invention, in lieu of the digital filter used in the filter bloc 25, a time-variable equalizer may be used controlled by the envelope estimate of the noise produced by the envelope extraction block. This narrows down to enhancing the frequency bands of the useful signal that correspond to frequency bands of the noise signal having a higher energy than a given value. LPC analysis methods and parameterizing techniques of filters are described in detail in the title by Kleijn et al. "Speech coding and synthesis", published by Elsevier, so they will not be developed here.

Figure 3:
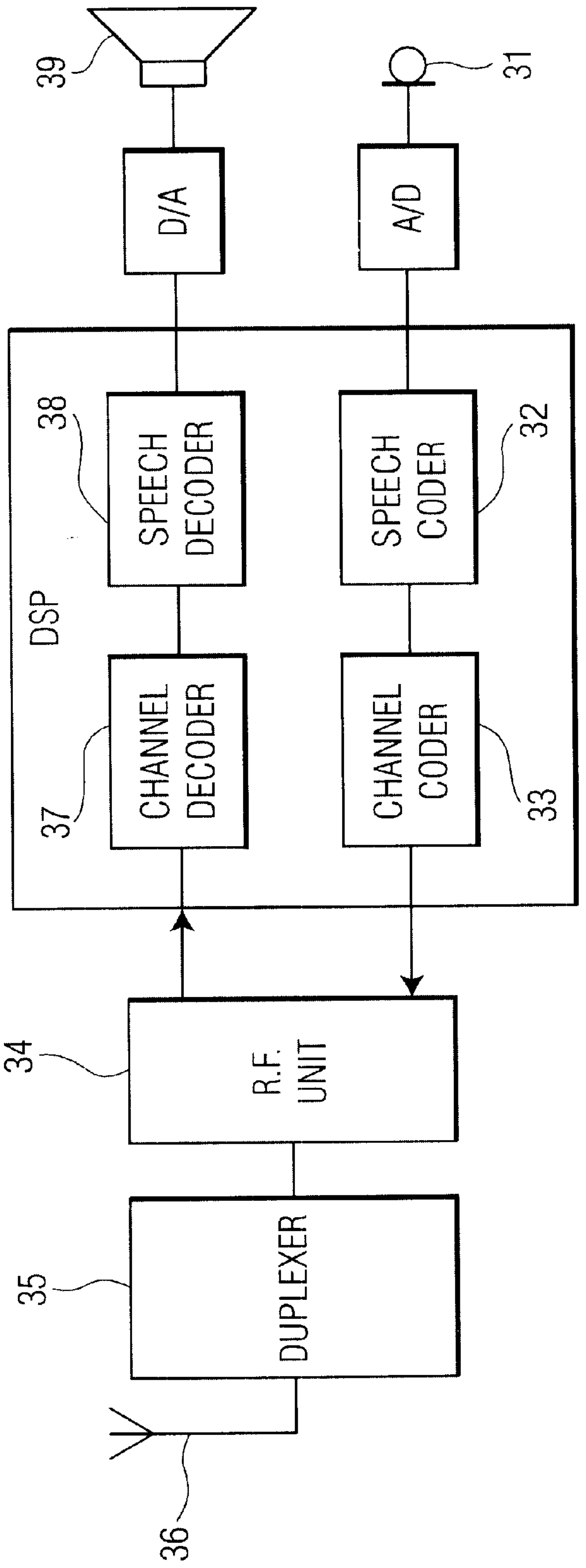
FIG. 3 is a diagram of a radiotelephone receiver according to the invention.

FIG. 3 is a block diagram representing a digital radiotelephone. It comprises a transmission chain formed by a microphone 31, an analog/digital converter A/D, a speech coder 32, a channel coder 33 and a module dedicated to the radio frequency portion 34 linked to the duplexer 35 coupled to a transceiver antenna 36. It also includes a receiving circuit formed by the antenna 36, the duplexer 35, the radio module 34, a channel decoder 37, a speech decoder 38, a digital/analog converter D/A and a loudspeaker 39. The coding and decoding modules 32, 33, 37 and 38 may be realized by a digital signal processor DSP.

According to an advantageous embodiment, the speech coder 32 includes envelope extraction means, for example, LPC analysis means of the telephone speech signal or useful signal. These means are notably provided by the digital radio telephony standards of the type GSM. The results of the LPC analysis are transferred to the speech decoder 38 which comprises a post-filtering block having a filter with coefficients that may be used as parameters for filtering the received signal with a device as described in FIG. 2. The modified signal is then sent to a loudspeaker output.

Figure 4:
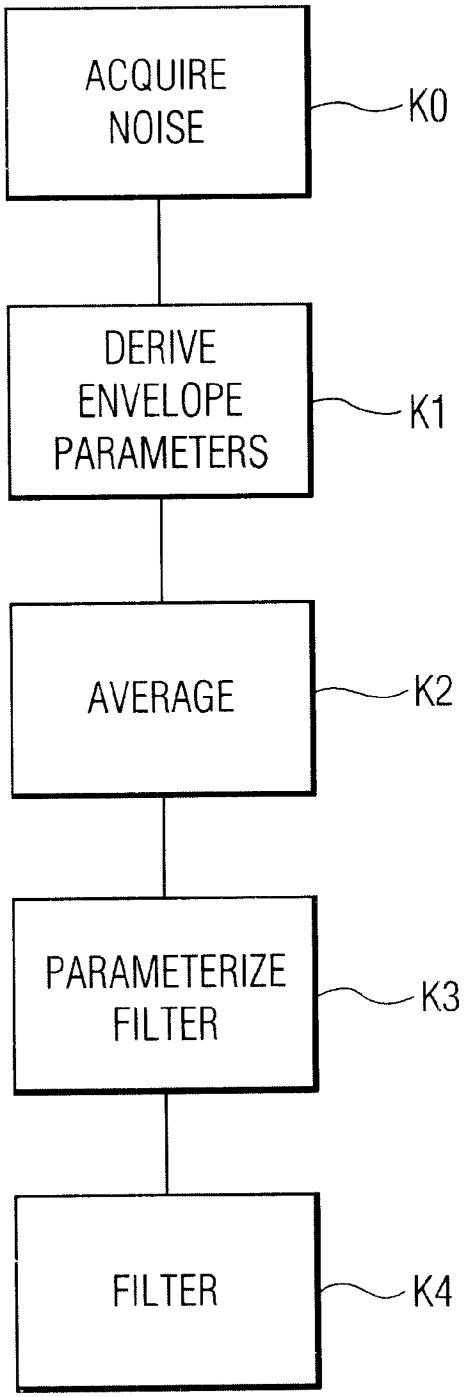
FIG. 4 is a flow chart to illustrate a receiving method according to the invention.

FIG. 4 shows a receiving method comprising a filtering method according to the invention realized by a radio receiver as represented in FIG. 3. It comprises:

an acquisition step K0 of tapping the ambient noise with the aid of sound sensors notably the microphone 31, a spectral analysis step K1 realized, for example, by the speech coder 32 and/or by the speech decoder 38, of extracting an estimate of a spectral envelope from the tapped noise signal and of deriving envelope parameters therefrom, a step K2 of calculating a time average between the envelope parameters to obtain average parameters, or control parameters, a parameterizing step k3 of parameterizing a digital filter with the aid of calculated control parameters, and a filtering step k4 of filtering the useful signal with the aid of a digital filter parameterized in this manner.

In this way there have been described and illustrated with the aid of examples an audio processing device, a receiver and a method of improving a user's acoustic comfort in the presence of ambient noise. Obviously, variants of embodiment may be provided without leaving the scope of the invention, notably as regards the structure of the filters used and the techniques of ambient noise acquisition or envelope extraction.

What is claimed is:

1. An audio processing device for filtering a useful signal, that has a spectral envelope situated in the voice band, and for restoring the useful signal in the presence of ambient noise, comprising means for tapping the ambient noise, spectral envelope extraction means for extracting envelope parameters of the ambient noise and digital filter means controlled by said envelope parameters for modifying the spectral envelope of the useful signal to be restored, said digital filter means comprising a digital filter having coefficients that can be parameterized, and co-operate with said envelope extraction means for parameterizing the digital filter using the envelope parameters.

2. A device as claimed in claim 1, further comprising an echo canceling loop controlled by an output signal of the digital filter for suppressing acoustic echo that exists in the ambient noise and for supplying an estimate of the ambient noise to said extraction means.

3. A device as claimed in claim 1, wherein said envelope extraction means comprise a predictive analyzer of the linear prediction coding type for supplying linear prediction coding envelope parameters to said digital filter.

4. A device as claimed in claim 1, wherein said digital filter means comprise calculation means for calculating a time average between the envelope parameters produced by said extraction means.

5. A receiver intended to receive a useful signal, having a spectral envelope situated in the voice band, comprising an audio processing device as claimed in claim 1.

6. A receiver as claimed in claim 5 comprising antenna means for receiving a radio signal, coupled to means for restoring a baseband audio signal and for retrieving said useful signal from the radio signal.

7. A telephone equipment comprising a receiver as claimed in claim 6.

8. A filtering method of filtering a useful signal, and restoring the useful signal in the presence of ambient noise, comprising the following steps:

an acquisition and spectral analysis step of tapping the ambient noise, extracting an estimate of a spectral envelope therefrom and of deriving envelope parameters therefrom, a step of calculating a time average between the envelope parameters to obtain average parameters, a parameterizing step of parameterizing a digital filter using said average parameters, and a filtering step of filtering the useful signal using said digital filter.

9. A receiving method for receiving the useful signal, having a useful spectral envelope, comprising a filtering method as claimed in claim 8, for modifying the useful spectral envelope before restoring the useful signal in the presence of the ambient noise.

10. An audio processing device comprising:

an analyzer which extracts an envelope of a noise signal and derives noise envelope parameters; and a filter having coefficients which vary in response to said noise envelope parameters; said filter filtering a useful signal to form a filtered signal.

11. The audio processing device of claim 10, further comprising an echo canceller that receives said noise signal and said useful signal and provides to said analyzer an estimate of said noise signal, wherein said analyzer extracts an estimated envelope of said estimate and derives estimated noise envelope parameters.

12. The audio processing device of claim 11, wherein said coefficients vary in response to said estimated noise envelope parameters.

13. The audio processing device of claim 11, wherein said echo canceller receives said filtered signal.

14. The audio processing device of claim 10, further comprising an echo canceller that receives said noise signal including an echo and provides to said analyzer an estimate of said noise signal, wherein said analyzer extracts an estimated envelope of said estimate and derives estimated noise envelope parameters.

15. The audio processing device of claim 14, wherein said coefficients vary in response to said estimated noise envelope parameters.

16. The audio processing device of claim 10, wherein said analyzer is a predictive analyzer and said envelope parameters are linear predictive coding envelope parameters.

17. The audio processing device of claim 10, wherein said analyzer smoothes said envelope parameters with time to form average parameters.

18. The audio processing device of claim 10, wherein said coefficients are varied so that said filter enhances frequency bands of said useful signal that correspond to frequency bands of said noise signal having a higher energy than a predetermined value.

19. A method of filtering a useful signal comprising:

extracting an envelope of a noise signal;

deriving noise envelope parameters from said envelope;

varying coefficients of a filter in response to said noise envelope parameters; and filtering said useful signal to form a filtered signal.

20. The method of claim 19, wherein said coefficients are varied so that said filter enhances frequency bands of said useful signal that correspond to frequency bands of said noise signal having a higher energy than a predetermined value.

21. The method of claim 19, further comprising:

providing said noise signal including an echo to an echo canceller;

providing said filtered signal to said echo canceller;

canceling said echo by said echo canceller;

forming an estimated noise signal;

extracting an estimated envelope of said estimated noise signal;

deriving estimated noise envelope parameters from said estimated envelope; and varying said coefficients in response to said estimated noise envelope parameters.

* * * * *